(12) United States Patent
Hosom et al.

(10) Patent No.: US 9,230,550 B2
(45) Date of Patent: Jan. 5, 2016

(54) SPEAKER VERIFICATION AND IDENTIFICATION USING ARTIFICIAL NEURAL NETWORK-BASED SUB-PHONETIC UNIT DISCRIMINATION

(71) Applicants: John-Paul Hosom, Portland, OR (US); Pieter J. Vermeulen, Portland, OR (US); Jonathan Shaw, Oregon City, OR (US)

(72) Inventors: John-Paul Hosom, Portland, OR (US); Pieter J. Vermeulen, Portland, OR (US); Jonathan Shaw, Oregon City, OR (US)

(73) Assignee: Sensory, Incorporated, Santa Clara, CA (US)

( * ) Notice: Subject to any disclaimer, the term of this patent is extended or adjusted under 35 U.S.C. 154(b) by 340 days.

(21) Appl. No.: 13/738,868

(22) Filed: Jan. 10, 2013

(65) Prior Publication Data

US 2014/0195236 A1    Jul. 10, 2014

(51) Int. Cl.
*G10L 17/00*      (2013.01)
*G10L 17/14*      (2013.01)
*G10L 17/18*      (2013.01)

(52) U.S. Cl.
CPC ............. *G10L 17/14* (2013.01); *G10L 17/18* (2013.01)

(58) Field of Classification Search
USPC .................. 704/246, 247, 249, 251, 252
See application file for complete search history.

(56) References Cited

U.S. PATENT DOCUMENTS

| | | | |
|---|---|---|---|
| 6,751,590 B1 * | 6/2004 | Chaudhari et al. | 704/246 |
| 6,760,701 B2 * | 7/2004 | Sharma et al. | 704/249 |
| 8,099,288 B2 * | 1/2012 | Zhang et al. | 704/275 |
| 8,554,555 B2 * | 10/2013 | Gruhn et al. | 704/232 |
| 8,639,502 B1 * | 1/2014 | Boucheron et al. | 704/226 |
| 8,645,137 B2 * | 2/2014 | Bellegarda et al. | 704/250 |
| 2007/0124145 A1 * | 5/2007 | Luan et al. | 704/254 |
| 2008/0154816 A1 * | 6/2008 | Xiao et al. | 706/15 |
| 2009/0216528 A1 | 8/2009 | Gemello et al. | |
| 2010/0217589 A1 * | 8/2010 | Gruhn et al. | 704/232 |
| 2011/0270788 A1 | 11/2011 | Moore | |
| 2011/0285504 A1 | 11/2011 | Puerto et al. | |

OTHER PUBLICATIONS

International Search Report and Written Opinion mailed on Mar. 27, 2014 in Application No. PCT/US2013/073374; 13 pages.
Bimbot et al., "A Tutorial on Text-Independent Speaker Verification," EURASIP Journal on Applied Signal Processing, 2004:4, pp. 430-451.
Olsson, "Text Dependent Speaker Verification with a Hybrid HMM/ANN System," Thesis Project in Speech Technology, Institutionen för tal, musik och hörsel, Kungliga Tekniska Högskolan, 100 44 Stockholm, Nov. 2002, 41 pages.

* cited by examiner

*Primary Examiner* — Leonard Saint Cyr
(74) *Attorney, Agent, or Firm* — Fountainhead Law Group P.C.

(57) ABSTRACT

In one embodiment, a computer system stores speech data for a plurality of speakers, where the speech data includes a plurality of feature vectors and, for each feature vector, an associated sub-phonetic class. The computer system then builds, based on the speech data, an artificial neural network (ANN) for modeling speech of a target speaker in the plurality of speakers, where the ANN is configured to discriminate between instances of sub-phonetic classes uttered by the target speaker and instances of sub-phonetic classes uttered by other speakers in the plurality of speakers.

37 Claims, 7 Drawing Sheets

SPEAKER VERIFICATION AND IDENTIFICATION USING ARTIFICIAL NEURAL NETWORK-BASED SUB-PHONETIC UNIT DISCRIMINATION

BACKGROUND

In speech recognition processing, speaker verification refers to the task of determining whether a speech sample of an unknown voice corresponds to a particular enrolled speaker. Prior art speaker verification systems typically generate a score for the speech sample using both a speaker-specific acoustic model and a separate, "generic" or "speaker independent" acoustic model. If the speaker-specific acoustic model outscores the generic acoustic model sufficiently, the speech sample is deemed to be from the enrolled speaker under consideration.

Speaker identification is a related task that involves associating a speech sample of an unknown voice with a speaker in a set of enrolled speakers. Prior art speaker identification systems are similar to prior art speaker verification systems, but score the speech sample using all available speaker-specific acoustic models. The speech sample is deemed to be from the enrolled speaker whose acoustic model produces the highest score. In certain cases, the speech sample is also scored against a generic acoustic model, such that the speech sample is deemed to be from an "imposter" (i.e., someone not in the set of enrolled speakers) if the highest scoring speaker-specific acoustic model does not outscore the generic acoustic model sufficiently.

One issue with scoring a speech sample against one or more speaker-specific acoustic models as well as a separate, generic acoustic model as noted above is that this increases the overall processing time for the speaker verification/identification task, since the scoring process must be repeated for the generic acoustic model. This can be problematic if the task is being performed on a device with limited compute resources. Further, in the speaker verification scenario, an appropriate decision threshold must be set with respect to the score generated via the speaker-specific acoustic model and the score generated via the generic acoustic model in order to determine whether to accept or reject the speech sample as being from the claimed speaker. The tuning of this decision threshold is difficult since it must account for potential variability in both scores.

Accordingly, it would be desirable to have improved techniques for speaker verification and identification that address the foregoing and other issues.

SUMMARY

According to one embodiment, a method comprises storing, by a computer system, speech data for a plurality of speakers, where the speech data includes a plurality of feature vectors and, for each feature vector, an associated sub-phonetic class. The method further comprises building, by the computer system based on the speech data, an artificial neural network (ANN) for modeling speech of a target speaker in the plurality of speakers, where the ANN is configured to discriminate between instances of sub-phonetic classes uttered by the target speaker and instances of sub-phonetic classes uttered by other speakers in the plurality of speakers.

In one embodiment, building the ANN comprises retrieving an existing ANN that includes a plurality of existing output nodes, where each existing output node corresponds to a sub-phonetic class and is configured to output a probability that a feature vector input to the existing ANN is an instance of the sub-phonetic class uttered by one of the other speakers in the plurality of speakers. The existing ANN is then modified to generate the ANN, where the modifying causes the ANN to include an output layer that comprises the plurality of existing output nodes and, for each existing output node, a new output node that corresponds to the same sub-phonetic class as the existing output node. The new output node is configured to output a probability that a feature vector input to the ANN is an instance of the sub-phonetic class uttered by the target speaker.

In one embodiment, building the ANN further comprises training the ANN using a first portion of the speech data originating from the target speaker such that, for each feature vector and associated sub-phonetic class in the first portion, the new output node that corresponds to the associated sub-phonetic class (i.e., the "target speaker" output node for that sub-phonetic class) is tuned to output a relatively higher probability and the existing output node that corresponds to the associated sub-phonetic class (i.e., the "anti-speaker" output node for that sub-phonetic class) is tuned to output a relatively lower probability.

In another embodiment, building the ANN further comprises training the ANN using a second portion of the speech data originating from the other speakers such that, for each feature vector and associated sub-phonetic class in the second portion, the new output node that corresponds to the associated sub-phonetic class is tuned to output a relatively lower probability and the existing output node that corresponds to the associated sub-phonetic class is tuned to output a relatively higher probability.

In one embodiment, the ANN further includes an input layer comprising a plurality of input nodes and one or more hidden layers comprising one or more hidden nodes. The input layer is connected to the lowest hidden layer in the one or more hidden layers via a first set of connections having a first set of weights, the one or more hidden layers (if more than one) are connected from a lower layer to a higher layer via a second set of connections having a second set of weights, and the highest hidden layer is connected to the output layer via a third set of connections having a third set of weights.

In one embodiment, training the ANN using the first and second portions of the speech data comprises applying a back-propagation algorithm to modify the third set of weights without modifying the first or second set of weights.

In one embodiment, the method further comprises receiving an acoustic signal corresponding to an utterance of a target phrase and extracting feature vectors from a plurality of frames in the acoustic signal. A score is then generated based on the feature vectors and the ANN, where the score indicates the likelihood that the target phrase was uttered by the target speaker.

In one embodiment, generating the score comprises performing a Viterbi search using a Hidden Markov Model (HMM) that lexically models the target phrase.

In one embodiment, at each frame in the plurality of frames, the Viterbi search passes a feature vector corresponding to the frame as input to the ANN and generates a per-frame speaker-verification score based on one or more probabilities output by the ANN (in addition to a standard cumulative likelihood score for each state in the HMM based on the plurality of ANN outputs).

In one embodiment, the per-frame speaker-verification score for a state in the HMM corresponds to the probability output by the new output node (i.e., a "target speaker" output node) in the ANN which is associated with that state in the HMM. In another embodiment, the per-frame speaker-verification score for a state in the HMM corresponds to the probability output by a new output node in the ANN which is associated with that state in the HMM, less the probability output by the existing output node associated with the new output node (i.e., the "anti-speaker" output node) in the ANN.

In one embodiment, generating the speaker-verification score further comprises applying a function to one or more of the per-frame speaker-verification scores to calculate the speaker-verification score.

In one embodiment, the function is an average function or a summation function over the plurality of speaker-verification scores associated with the most likely sequence of states as determined by the Viterbi search.

In one embodiment, the function is applied to a subset of the per-frame speaker-verification scores that correspond to relevant frames in the plurality of frames, where each relevant frame is classified, via the Viterbi search, as being part of a phoneme that is considered useful for speaker verification or identification.

According to another embodiment, non-transitory computer readable storage medium is provided that has stored thereon program code executable by a computer system. The program code includes code that causes the computer system to store speech data for a plurality of speakers, where the speech data includes a plurality of feature vectors and, for each feature vector, an associated sub-phonetic class. The program code further includes code that causes the computer system to build, based on the speech data, an ANN for modeling speech of a target speaker in the plurality of speakers, where the ANN is configured to discriminate between instances of sub-phonetic classes uttered by the target speaker and instances of sub-phonetic classes uttered by other speakers in the plurality of speakers.

According to another embodiment, a system is provided that includes a processor. The processor is configured to store speech data for a plurality of speakers, where the speech data includes a plurality of feature vectors and, for each feature vector, an associated sub-phonetic class. The processor is further configured to build, based on the speech data, an ANN for modeling speech of a target speaker in the plurality of speakers, where the ANN is configured to discriminate between instances of sub-phonetic classes uttered by the target speaker and instances of sub-phonetic classes uttered by other speakers in the plurality of speakers.

A further understanding of the nature and advantages of the embodiments disclosed herein can be realized by reference to the remaining portions of the specification and the attached drawings.

DETAILED DESCRIPTION

Figure 1:
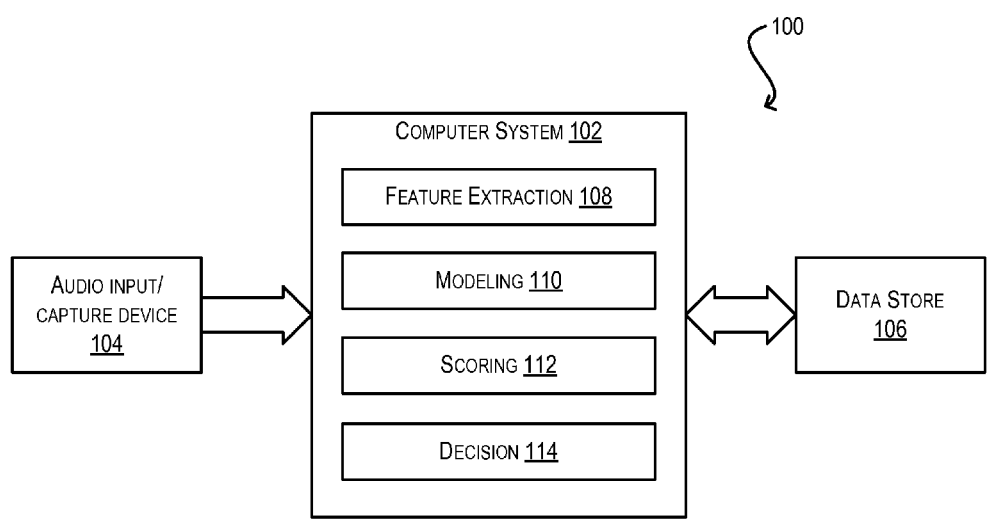
FIG. 1 depicts a block diagram of a system environment according to one embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

Embodiments of the present invention provide techniques for improved speaker verification and identification. In one set of embodiments, the techniques described herein can build, for a target speaker, a speaker-specific acoustic model (referred to as a "speaker model") that not only discriminates between different sounds (e.g., sub-phonetic classes) uttered by the target speaker, but also discriminates between sounds uttered by the target speaker and sounds uttered by other speakers distinct from the target speaker (referred to collectively as "the anti-speaker").

For example, the speaker model can be trained using both target speaker and anti-speaker speech data. Once trained, the speaker model can determine whether an input sound is closer to the target speaker speech data (and thereby reject the premise that the input sound was uttered by the anti-speaker), or closer to the anti-speaker speech data (and thereby reject the premise that the input sound was uttered by the target speaker). In this manner, the speaker model can simultaneously model the acoustic characteristics of both the target speaker and the anti-speaker. One practical advantage of this approach is that only a single acoustic model (i.e., the speaker model) needs to be scored during the testing/challenge phase of speaker verification/identification. This is in contrast to prior art approaches, which require scoring of both a speaker-specific acoustic model (for the target speaker) and a separate, generic acoustic model (for the anti-speaker).

In a particular embodiment, the speaker model that is built for the target speaker can be in the form of an artificial neural network, or ANN. As described in further detail below, building this ANN can include retrieving an existing ANN that includes a number of existing output nodes and duplicating the existing output nodes and the plurality of weights to these nodes to generate new output nodes. During the training process, if a training sample originating from the target speaker is input to the ANN, the new output node corresponding to the sub-phonetic class to which the training sample is classified can be tuned to produce a relatively high output value (i.e., probability value), while the existing output node corresponding to the same sub-phonetic class can be tuned to produce a relatively low output value. Conversely, if a training sample originating from the anti-speaker is input to the ANN, the new output node corresponding to the sub-phonetic class to which the training sample is classified can be tuned to produce a relatively low output value, while the existing output node corresponding to the same sub-phonetic class can be tuned to produce a relatively high output value.

FIG. 1 depicts a block diagram of a system environment 100 according to an embodiment. As shown, system environment 100 includes a computer system 102 that is communicatively coupled with an audio input/capture device 104 and a data store 106. Computer system 102 includes various modules (feature extraction module 108, modeling module 110, scoring module 112, and decision module 114) for enabling speaker verification and identification.

Figure 2:
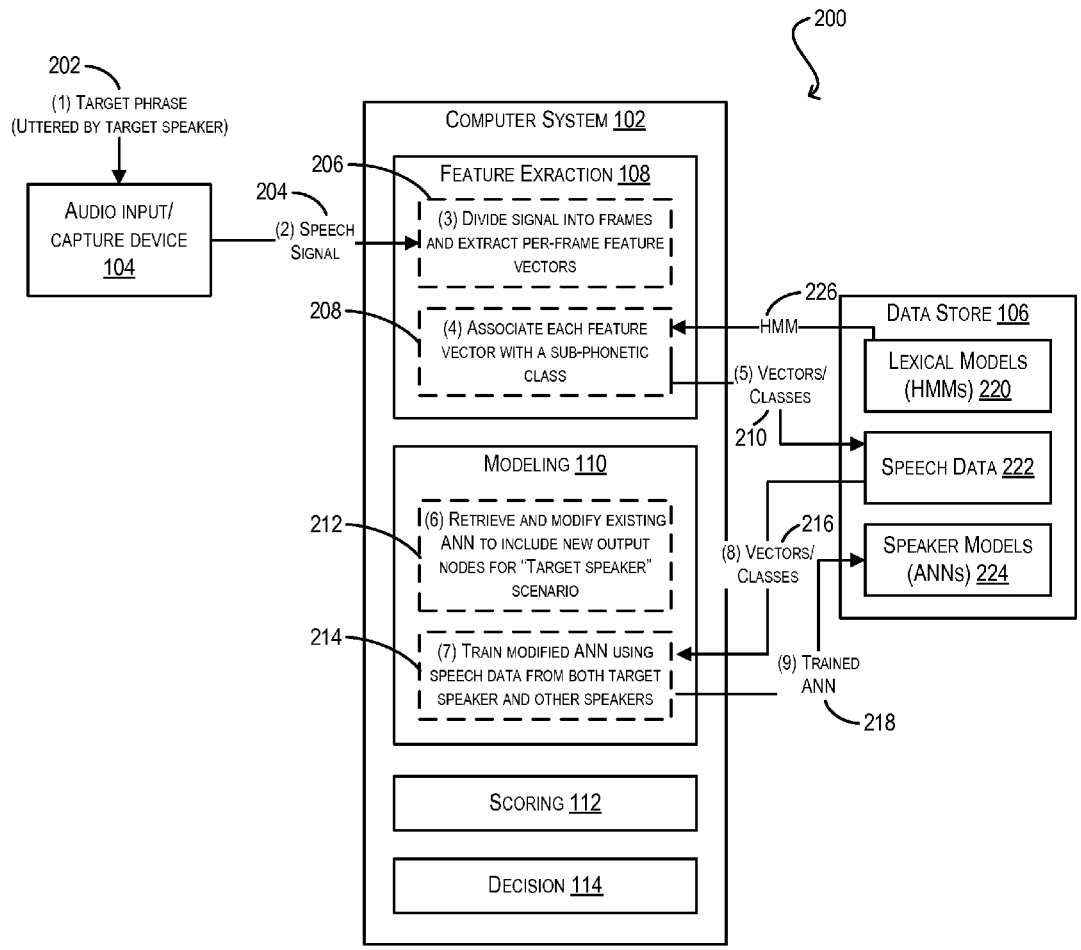
FIG. 2 depicts a flow diagram for the enrollment and training phases of a speaker verification/identification system according to one embodiment.

FIG. 2 depicts a flow 200 in the context of system environment 100 for carrying out the enrollment and training phases of a speaker verification/identification workflow according to an embodiment. At step (1) of flow 200 (reference numeral 202), audio input/capture device 104 can receive an utterance of a target phrase spoken by a target speaker. Audio input/capture device 104 can then convert the utterance into a digital speech signal.

At step (2) (reference numeral 204), feature extraction module 108 of computer system 102 can receive the digitized speech signal. In FIG. 2, the speech signal is shown as being received directly from audio input/capture device 104. In alternative embodiments, feature extraction module 108 can retrieve the speech signal from a storage medium (not shown) where the speech signal has been recorded.

At step (3) (reference numeral 206), feature extraction module 108 can divide the speech signal into a number of time windows, or frames. Each frame can have a predefined duration, such as 10 milliseconds, 20 milliseconds, 30 milliseconds, or the like. For example, if the total length of the speech signal is 3 seconds and if the predefined duration of each frame is 10 milliseconds, the speech signal will be divided into 300 total frames (assuming no frame overlap). In certain embodiments, consecutive frames can overlap by a predefined amount, such as 10 milliseconds, which will increase the number of frames beyond the non-overlapping scenario.

Once the speech signal has been divided into frames, feature extraction module 108 can calculate a feature vector for each frame. In one embodiment, this process can include applying a series of transformations and other functions (including a "cepstral" transform) to the portion of the speech signal comprising the frame. The resulting feature vector is a cepstral representation of the frame that is more compact and more suitable for statistical modeling than the original speech signal data. In a particular embodiment, each feature vector can include 39 elements.

At step (4) (reference numeral 208), feature extraction module 108 can associate, or map, each feature vector extracted at step (3) to a particular sub-phonetic class. As used herein, a sub-phonetic class refers to a type of speech unit referred to as a sub-phone. Each sub-phone can represent the beginning, middle, or end of a larger speech unit (e.g., a phone or phoneme). By mapping feature vectors to sub-phonetic classes, feature extraction module 108 can correlate the feature vectors with the particular sub-phones that were spoken by the target speaker during the corresponding frames of the speech signal. In one embodiment, each feature vector can be associated with one of 1130 different sub-phonetic classes that represent the beginning, middle, and end of 49 different phonemes in various phonetic contexts. In other embodiments, other sub-phonetic (or phonetic) taxonomies can be used.

In order to carry out the processing of step (4), feature extraction module 108 can force align the feature vectors using a predefined Hidden Markov Model (HMM) that lexically defines the target phrase. In this embodiment, feature extraction module 108 can retrieve the HMM for the target phrase from a database of such HMMs (220) stored in data store 106 (shown via arrow 226), and then run a Viterbi search over the feature vectors with the HMM (using transitions between HMM states that are "forced" to correspond to the target word). The result of the Viterbi search is a mapping between feature vectors and sub-phonetic classes corresponding to the best state path in the HMM.

At step (5), feature extraction module 108 can store the feature vectors and their associated sub-phonetic classes in a speech data database 222 of data store 106. The enrollment process of steps (1)-(5) can then be repeated several times to collect and process additional samples of the target phrase from the target speaker. Steps (1)-(5) can also be repeated for other speakers distinct from the target speaker (i.e., collectively "the anti-speaker") so that speech data for those other speakers can also be collected.

The remaining steps of flow 200 represent the training phase of the speaker verification/identification workflow. At step (6) (reference numeral 212), modeling module 110 can retrieve an existing ANN that includes an output layer comprising a number of existing output nodes (one output node per sub-phonetic class). In one embodiment, the existing ANN can represent a generic speaker model that has been pre-trained on training data from a relatively large population of speakers and noise conditions. Modeling module 110 can then modify the existing ANN by duplicating each existing output node (and the plurality of weights to each output node) to create a corresponding new output node. Thus, the output layer in the modified ANN can include two output nodes (one existing, one new) for each sub-phonetic class.

Once the output layer of the existing ANN has been modified, modeling module 110 can train the modified ANN using both speech data from the target speaker and speech data from other speakers (the anti-speaker) such that the modified ANN is tuned to (1) identify the target speaker with high output values from the new output nodes and low output values from the existing output nodes; and (2) identify the anti-speaker with low output values from the new output nodes and high output values from the existing output nodes. (step (7), reference numeral 214). By way of example, modeling module 110 can retrieve, from speech data 222, a feature vector "V1" (and its associated sub-phonetic class "C1") that originates from the target speaker (step (8), reference numeral 216). Modeling module 110 can then input V1 to the modified ANN as a positive example of C1 with respect to the new output node for C1 and as a negative example of C1 with respect to the existing output node for C1. This can be repeated for other feature vector/sub-phonetic class pairs in speech data 222 originating from the target speaker.

As another example, modeling module 110 can retrieve, from speech data 222, a feature vector "V2" (and its associated sub-phonetic class "C1") that originates from the anti-speaker (step (8), reference numeral 216). Modeling module 110 can then input V2 to the modified ANN as a negative example of C1 with respect to the new output node for C1 and as a positive example of C1 with respect to the existing output node for C1. This can be repeated for other feature vector/sub-phonetic class pairs in speech data 222 originating from the anti-speaker. In a speaker verification scenario, the anti-speaker training data used at this step can correspond to speech data collected from a sample of a large population. In a speaker identification scenario, the anti-speaker training data used at this step can correspond to speech data collected from other speakers enrolled in the same system.

Finally, at step (9) (reference numeral 218), modeling module 110 can stored the trained ANN in a speaker model database 224 of data store 106.

With the approach above, the trained ANN is not limited to simply discriminating between instances of sub-phonetic classes uttered by the target speaker; rather, the trained ANN can also effectively discriminate between instances of sub-phonetic classes uttered by the target speaker and instances of sub-phonetic classes uttered by the anti-speaker. This improves the accuracy of the ANN in identifying the target speaker and, as described with respect to FIG. 3 below, eliminates the need to score a separate, generic acoustic model during the testing/challenge phase. Accordingly, both the speed and precision of the overall speaker verification/identification task can be significantly improved.

Figure 3:
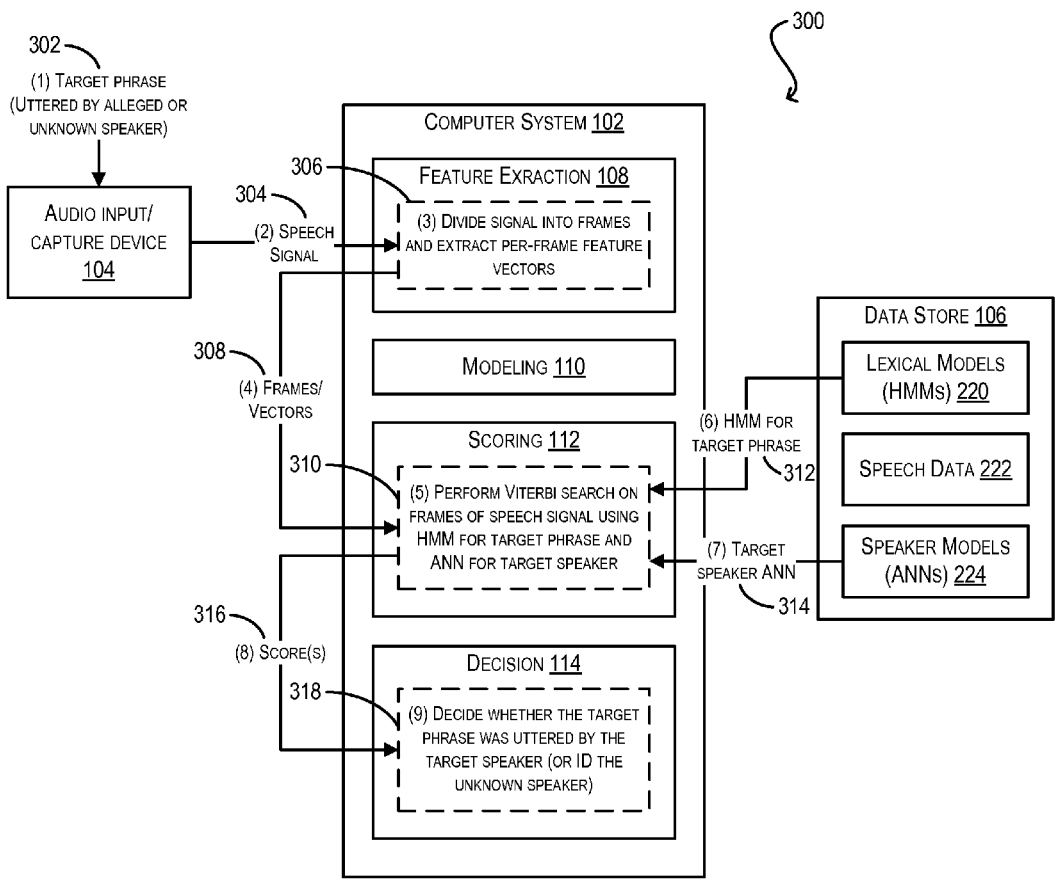
FIG. 3 depicts a flow diagram for the testing/challenge phase of a speaker verification/identification system according to one embodiment.

FIG. 3 depicts a flow 300 in the context of system environment 100 for carrying out the testing/challenge phase of a speaker verification/identification workflow according to an embodiment. In various embodiments, flow 300 can be performed after flow 200 of FIG. 2.

At step (1) of flow 300 (reference numeral 302), audio input/capture device 104 can receive an utterance of a target phrase spoken by an alleged or unknown speaker. For example, the speaker may be claiming to be the target speaker enrolled in FIG. 2 (and thus needs to be verified), or may not provide any indication of identity (and thus needs to be identified from among the set of enrolled speakers). Upon capturing the utterance, audio input/capture device 104 can pass a speech signal corresponding to the utterance, either directly or indirectly, to feature extraction module 108 (step (2), reference numeral 304).

At step (3) (reference numeral 306), feature extraction module 108 can divide the speech signal into frames and extract per-frame feature vectors in a manner that is substantially similar to step (3) of flow 200. Feature extraction module 108 can then pass the frames and extracted feature vectors to scoring module 112 (step (4), reference numeral 308).

At step (5) (reference numeral 310), scoring module 112 can score the speech signal against one or more speaker models. For example, in the speaker verification scenario, scoring module 112 can retrieve the ANN for the claimed speaker (i.e., the target speaker) as trained per flow 200, as well as the HMM for the target phrase from HMM database 220 (steps (6) and (7), reference numerals 312 and 314). Scoring module 112 can then generate a speaker-verification score by performing a Viterbi search on the frames/feature vectors of the speech signal using the ANN and the HMM. The speaker-verification score (which is based on a sequence of per-frame speaker-verification scores) represents the overall estimate that the speech signal was uttered by the target speaker. Additional details regarding this scoring process are described with respect to FIG. 6 below. As noted previously, since the ANN has been trained to discriminate between the target speaker and the anti-speaker, there is no need to separately score the speech signal against a generic acoustic model.

The speaker identification scenario is similar to the speaker verification scenario, but involves scoring the speech signal against every trained speaker model in speaker model database 224. There is no need to separately score the speech signal against a generic acoustic model to identify an "imposter" speaker.

Once the speaker-verification score(s) have been generated, they can be passed to decision module 114 (step (8), reference numeral 316). At step (9) (reference numeral 318), decision module 114 can verify or identify the alleged/unknown speaker. For verification, decision module 114 can compare the speaker-verification score generated by the target speaker model with a predefined threshold. If the speaker-verification score is above the threshold, the speaker is determined to be the target speaker, and if the speaker-verification score is below the threshold, the speaker is determined to not be the target speaker.

For identification, decision module 114 can compare the various speaker-verification scores generated by the speaker models against each other. Decision module 114 can then identify the speaker based on the highest scoring speaker model. In certain embodiments, decision module 114 can also compare the various speaker-verification scores against a predefined threshold. If all of the speaker-verification scores fall below the threshold, decision module 114 can determine that the speaker is an imposter (i.e., is not any of the enrolled speakers).

It should be appreciated that FIGS. 1-3 are illustrative and not intended to limit embodiments of the present invention. For example, although the enrollment and training flow of FIG. 2 and the testing/challenge flow of FIG. 3 are shown as being executed by a single computer system 102, in alternative embodiments these flows can be executed by different computer systems. For example, the enrollment and training flow of FIG. 2 can be executed by a server computer of a service/resource provider, while the challenge/testing flow of FIG. 3 can be executed by a personal computing device (e.g., desktop computer, smartphone, tablet, etc.) of an end-user. In these embodiments, the server computer and the personal computing device may only include those modules shown within computer system 102 that are necessary to carry out their designated functions. Further, the various entities depicted in system environment 100 can have other capabilities or include other components that are not specifically described. One of ordinary skill in the art will recognize many variations, modifications, and alternatives.

Figure 4:
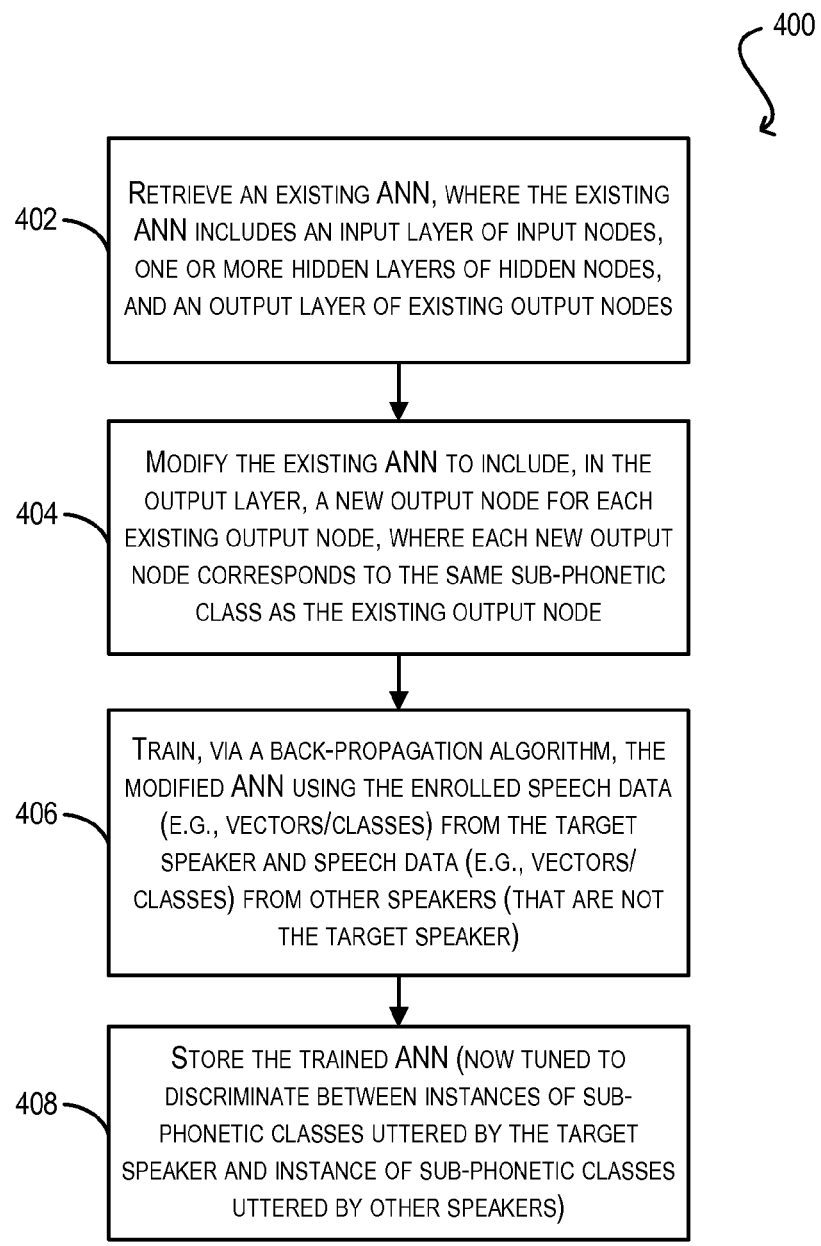
FIG. 4 depicts a flowchart of a process for building an ANN-based speaker model according to one embodiment.

FIG. 4 depicts a flowchart 400 that provides a more detailed description of the ANN building/training process performed by modeling module 110 at steps (6) and (7) of flow 200 according to an embodiment. At block 402, modeling module 110 can retrieve an existing ANN that corresponds to a baseline or generic speaker model. As noted with respect to FIG. 2, this existing ANN may have been previously trained on training data from a relatively large population of speakers. In one embodiment, the existing ANN can be a multi-layer perceptron (MLP) that includes an input layer of input nodes, one or more hidden layers of hidden nodes, and an output layer of existing output nodes.

At block 404, modeling module 110 can modify the existing ANN to create a modified ANN, where the modified ANN includes a new output node for each existing output node in the existing ANN. Thus, the output layer of the modified ANN can include twice as many output nodes as the existing ANN. Each pair of existing and new output nodes in the modified ANN can be associated with a single sub-phonetic class, such that the new output node in the pair reflects the probability that an input feature vector corresponds to an utterance of that sub-phonetic class by a target speaker, and the existing output node in the pair reflects the probability that the input feature vector corresponds to a utterance of that sub-phonetic class by another speaker that is not the target speaker (i.e., the anti-speaker).

Figure 5:
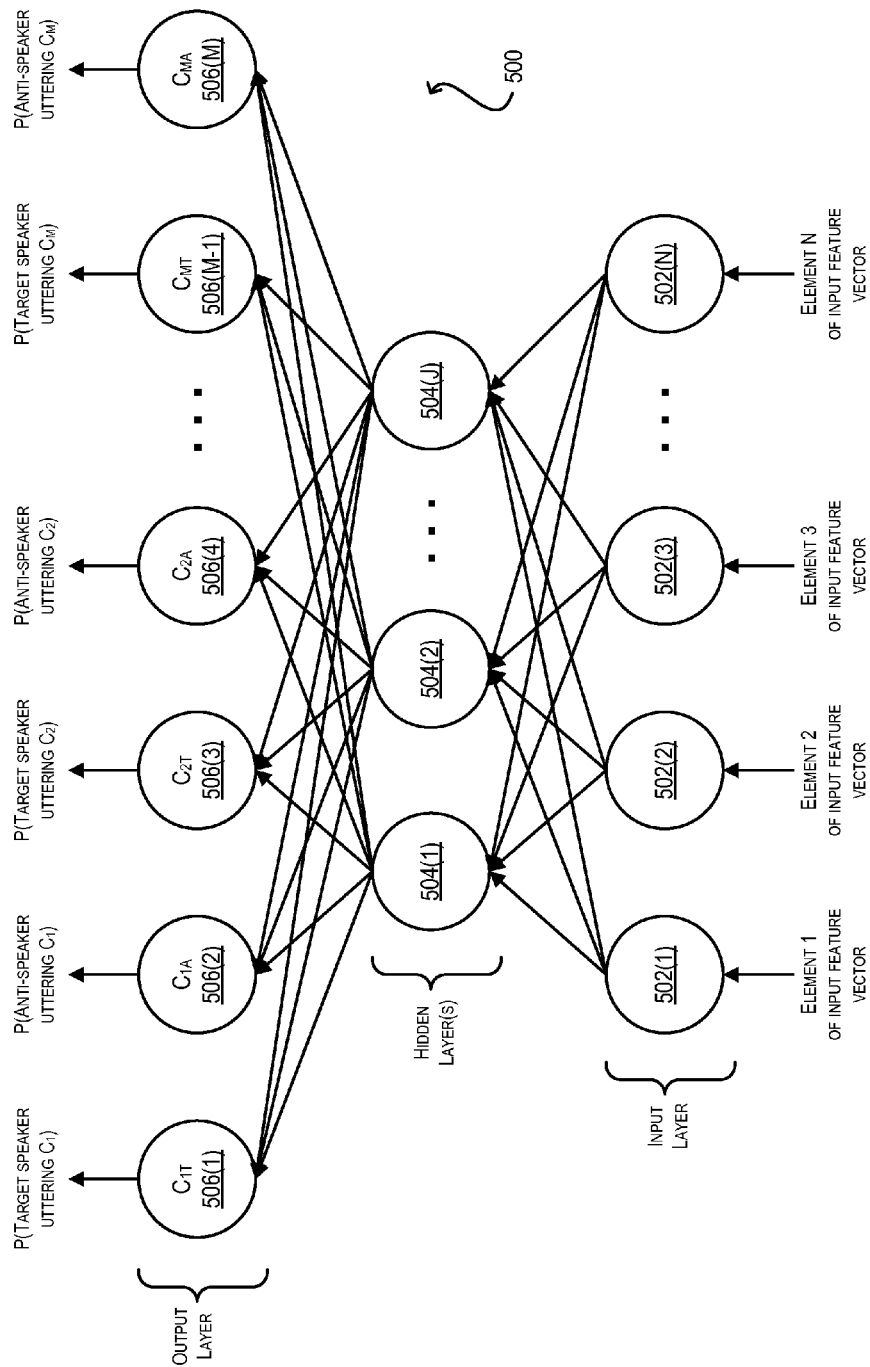
FIG. 5 depicts an example ANN according to one embodiment.

FIG. 5 depicts an exemplary ANN 500 has been modified per block 404 of FIG. 4. As shown, ANN 500 includes a number of input nodes 502(1)-502(N) that comprise an input layer. Input nodes 502(1)-(N) are each configured to take, as input, an element of a feature vector. In a particular embodiment, ANN can include 39 total input nodes.

Further, ANN 500 includes a number of hidden nodes 504(1)-504(J) that comprise one or more hidden layers. The lowest hidden layer is connected to the input layer via a first set of connections, where each connection in the first set is associated with a weight. In addition, each hidden layer is connected from a lower layer to a higher layer via a second set of connections, where each connection in the second set is associated with a weight. The hidden layers are configured to characterize the vector elements received via input nodes 502(1)-504(N) into a higher-dimensional space for sub-phonetic classification, as well as filter out noise.

Yet further, ANN 500 includes a number of output nodes 506(1)-506(M) that comprise an output layer. The output layer is connected to the highest hidden layer via a third set of connections, where each connection in the third set is also associated with a weight. Each pair of output nodes in ANN 500 corresponds to an existing output node and a new output node for a particular sub-phonetic class. For example, node 506(1) corresponds to the new output node for sub-phonetic class C1 and node 506(2) corresponds to the existing output node for sub-phonetic class C1. As noted above, each node in the pair is configured to output a value indicating the likelihood that a target speaker or the anti-speaker uttered the sub-phonetic class (in response to an input feature vector). For instance, node 506(1) is configured to output a probability that the target speaker uttered an instance of C1, while node 506(2) is configured to output a probability that the anti-speaker uttered an instance of C1.

Returning to FIG. 4, at block 406, modeling module 110 can train the modified ANN using enrolled speech data from the target speaker. For example, modeling module 110 can retrieve, from speech data 222, a feature vector originating from the target speaker and pass the feature vector as an input to the modified ANN. Then, via an on-line back-propagation algorithm, modeling module 110 can tune the weights in the ANN in response to the feature vector such that (1) the new output node corresponding to the feature vector's associated sub-phonetic class outputs a relatively high value, and (2) the existing output node corresponding to the feature vector's associated sub-phonetic class outputs a relatively low value. In this manner, the new output node (i.e., the "target speaker node") can be tuned to identify the target speaker's utterance, while the existing output node (i.e., the "anti-speaker node") can be tuned to reject the target speaker's utterance.

In a particular embodiment, the training run described above can be configured to modify only two sets of weights in the entire ANN—the set of weights leading to the existing output node and the set of weights leading to the new output node respectively for the input feature vector's associated sub-phonetic class. The other weights in the ANN (including the weights between the input layer and the hidden layer or weights between the hidden layers) remain untouched. By limiting the training process in this way, the overall time required to tune the ANN can be significantly reduced.

Also at block 406, modeling module 110 can train the modified ANN using enrolled speech data from the anti-speaker. For example, modeling module 110 can retrieve, from speech data 222, a feature vector originating from the anti-speaker and pass the feature vector as an input to the modified ANN. Then, via the same on-line back-propagation algorithm, modeling module 110 can tune the weights in the ANN in response to the feature vector such that (1) the new output node corresponding to the feature vector's associated sub-phonetic class outputs a relatively low value, and (2) the existing output node corresponding to the feature vector's associated sub-phonetic class outputs a relatively high value. In this manner, the new output node (i.e., the "target speaker node") can be tuned to reject the anti-speaker's utterance, while the existing output node (i.e., the "anti-speaker node") can be tuned to identify the anti-speaker's utterance.

The optimum number of target speaker training samples and anti-speaker training samples to use per sub-phonetic class and the optimum number of training iterations to perform can be determined empirically. In certain embodiments, the optimum number of training samples for the anti-speaker scenario may be different from the optimum number of training samples for the target speaker scenario.

Once the modified ANN has been trained using both target speaker and anti-speaker speech data per block 406, modeling module 110 can store the trained ANN in speaker model database 224 for use at the time of challenge/testing (block 408).

Figure 6:
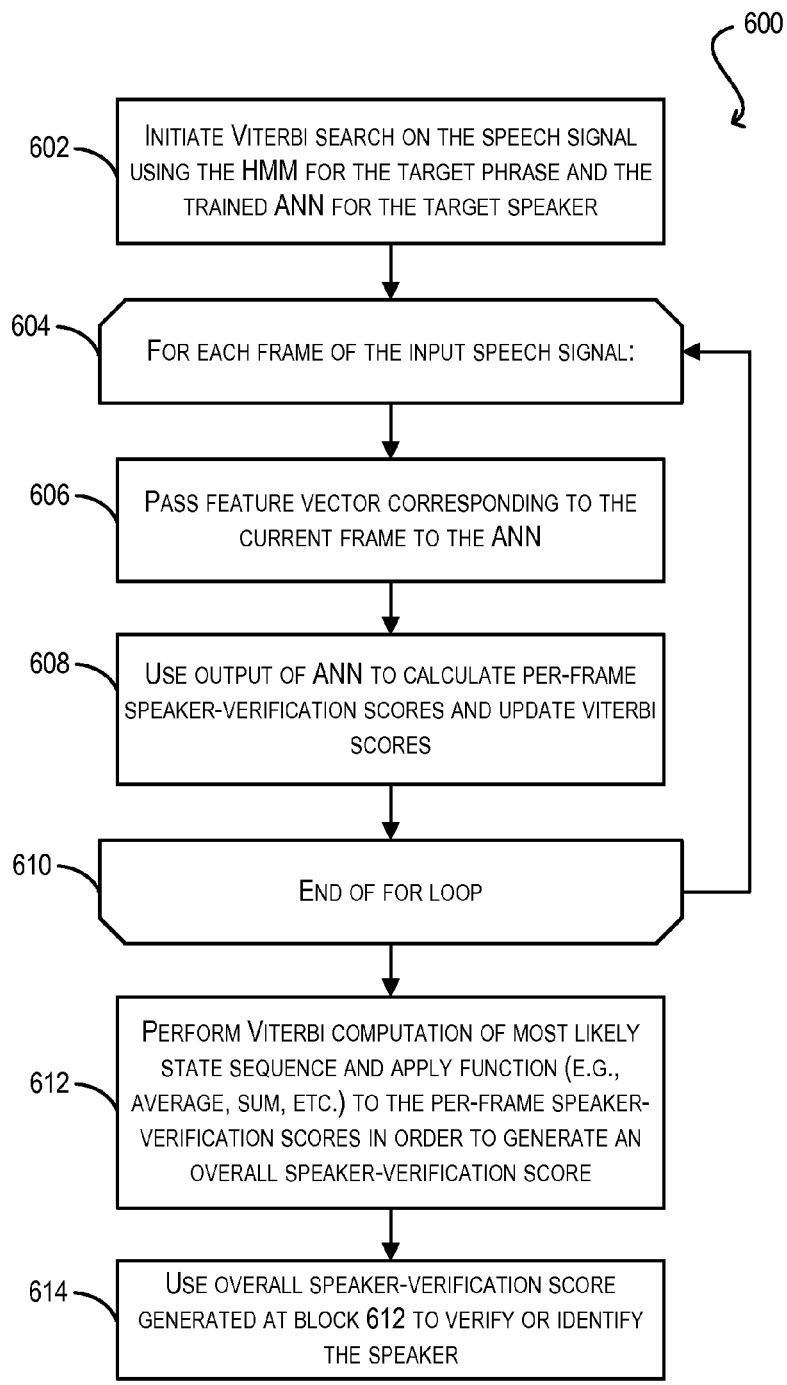
FIG. 6 depicts a flowchart of a process for generating a score for an input speech signal according to an embodiment.

FIG. 6 depicts a flowchart 600 that provides a more detailed description of the scoring/decision process performed by scoring module 112 and decision module 114 at steps (5) and (9) of flow 300 according to an embodiment. At block 602, scoring module 112 can initiate a Viterbi search on a speech signal received from an unknown/alleged speaker using the HMM for the target phrase and the ANN that has been trained for a target speaker. The Viterbi search is configured to determine the most likely sequence of sub-phonetic classes assuming that the target speaker uttered the target phrase within the speech signal.

At block 604, as part of the Viterbi search, scoring module 112 can enter a FOR loop for each frame in the speech signal. Within the loop, scoring module 112 can pass the feature vector for the current frame to the ANN (block 606). Scoring module 112 can then use the output from the ANN to calculate a per-frame speaker-verification score indicating the likelihood that the current frame was uttered by the target speaker (block 608) as well as the standard cumulative likelihood score for each state in the HMM based on the plurality of ANN outputs. In one embodiment, the per-frame speaker-verification score for a state in the HMM can be based on the probability value output by the new output node (i.e., target speaker output node) in the ANN. In an alternative embodiment, the per-frame speaker-verification score for a state in the HMM can be based on the probability value output by the new output node (i.e., target speaker output node) in the ANN, less the probability value of the existing output node (i.e., anti-speaker output node) corresponding to that new output node.

At block 610, scoring module 112 can reach the end of the current loop iteration and return to block 604 to process additional frames if necessary.

Once the per-frame scores have been calculated, scoring module 112 can apply (a) the Viterbi backtrace computation to determine the most likely state sequence and (b) a function (e.g., average, summation, etc.) to the per-frame speaker-verification scores to generate a single, overall speaker-verification score (block 612). In certain embodiments, scoring module 112 can apply this function to all of the per-frame speaker-verification scores generated at block 608 that are associated with the most likely state sequence as determined by the Viterbi search. In other embodiments, scoring module 112 can apply this function to a subset of per-frame speaker-verification scores that represent "relevant" frames in the speech signal. As used herein, a "relevant" frame is a frame that has been classified (via the Viterbi search) as being part of a phoneme that is considered useful for speaker verification or identification. The following is an exemplary list of phonemes (in a modified Worldbet notation) that are not considered useful according to one embodiment:

.pau b b-j b: b_c c c' c-h d d-j d: d_c dr dr: g g-j g: g_c J K k k' k-h k-j K: k: k_c k_h p p' p-h p-j p: p_c p_h t t'
t-h t-j t: t_c t_h tq tq: tr tr: t_( z D v s T f h Finally, at block 614, decision module 114 can use the speaker-verification score generated at block 612 to verify or identify the unknown/alleged speaker. For example, in the verification scenario, if the speaker-verification score is greater than a predefined threshold, decision module 114 can determine that the speech signal was uttered by the target speaker; if the speaker-verification score is less than the predefined threshold, decision module 114 can determine that the speech signal was not uttered by the target speaker. In the identification scenario, decision module 114 can compare the speaker-verification scores generated for all of the speaker models in the system and identify the highest scoring speaker model as the speaker.

Figure 7:
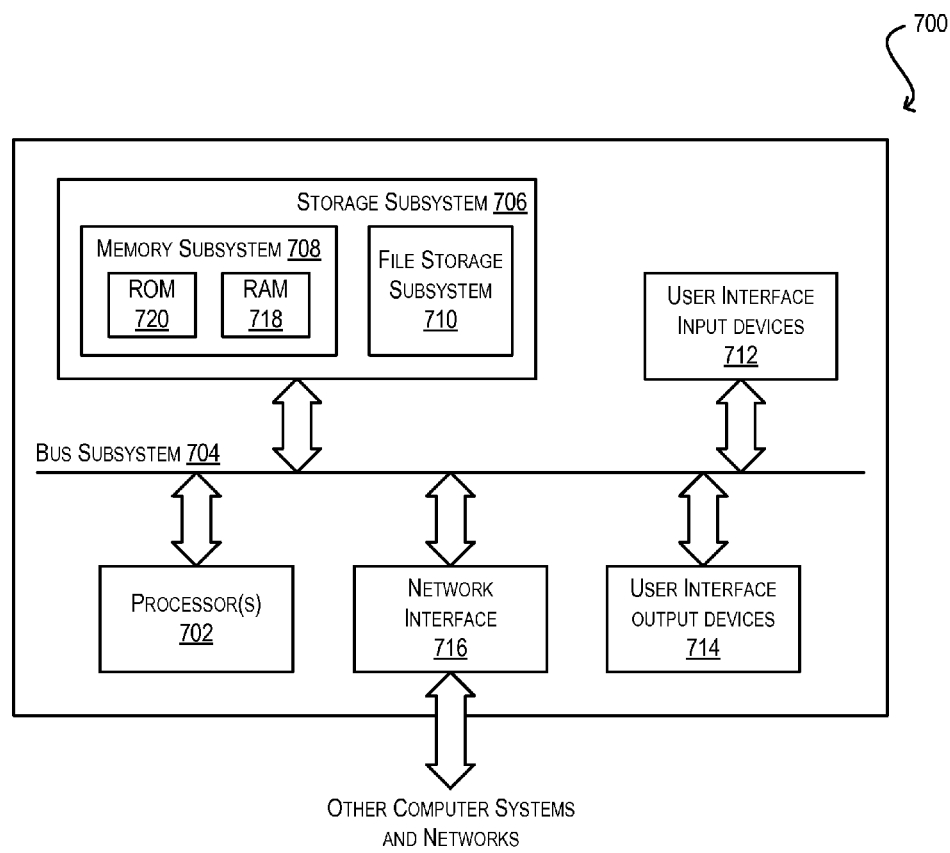
FIG. 7 depicts a block diagram of a computer system according to one embodiment.

FIG. 7 is a simplified block diagram of a computer system 700 according to an embodiment of the present invention. In one embodiment, computer system 700 can be used to implement computer system 102 of FIGS. 1-3. As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of embodiments of the present invention.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and not intended to limit embodiments of the present invention. Many other configurations having more or fewer components than system 700 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    storing, by a computer system, speech data for a plurality of speakers, the speech data including a plurality of feature vectors and, for each feature vector, an associated sub-phonetic class;
    building, by the computer system based on the speech data, an artificial neural network (ANN) for modeling speech of a target speaker in the plurality of speakers, the ANN being configured to discriminate between instances of sub-phonetic classes uttered by the target speaker and instances of sub-phonetic classes uttered by other speakers in the plurality of speakers;
    wherein building the ANN comprises:
    retrieving an existing ANN that comprises a plurality of existing output nodes, each existing output node corresponding to a sub-phonetic class and being configured to output a probability that a feature vector input to the existing ANN is an instance of the sub-phonetic class uttered by one of the other speakers in the plurality of speakers; and
    modifying the existing ANN to generate the ANN, wherein the modifying causes the ANN to include an output layer that comprises the plurality of existing output nodes and, for each existing output node, a new output node that corresponds to the sub-phonetic class of the existing output node, the new output node being configured to output a probability that a feature vector input to the ANN is an instance of the sub-phonetic class uttered by the target speaker; and
    verifying or identifying the target speaker using the ANN.

2. The method of claim 1 wherein building the ANN further comprises:
    training the ANN using a first portion of the speech data originating from the target speaker such that, for each feature vector and associated sub-phonetic class in the first portion, the new output node that corresponds to the associated sub-phonetic class is tuned to output a relatively higher probability and the existing output node that corresponds to the associated sub-phonetic class is tuned to output a relatively lower probability.

3. The method of claim 2 wherein building the ANN further comprises:
    training the ANN using a second portion of the speech data originating from the other speakers such that, for each feature vector and associated sub-phonetic class in the second portion, the new output node corresponding to the associated sub-phonetic class is tuned to output a relatively lower probability and the existing output node corresponding to the associated sub-phonetic class is tuned to output a relatively higher probability.

4. The method of claim 3 wherein the ANN further includes an input layer comprising a plurality of input nodes and one or more hidden layers comprising one or more hidden nodes.

5. The method of claim 4 wherein the input layer is connected to a lowest hidden layer in the one or more hidden layers via a first set of connections having a first set of weights, wherein the one or more hidden layers are connected from a lower layer to a higher layer via a second set of connections having a second set of weights, wherein a highest hidden layer in the one or more hidden layers is connected to the output layer via a third set of connections having a third set of weights, and wherein training the ANN using the first and second portions of the speech data comprises applying a back-propagation algorithm to modify the third set of weights without modifying the first or second set of weights.

6. The method of claim 1 wherein verifying or identifying the target speaker using the ANN comprises:
    receiving an acoustic signal corresponding to an utterance of a target phrase;
    extracting feature vectors from a plurality of frames in the acoustic signal; and
    generating, based on the feature vectors and the ANN, a speaker-verification score indicating a likelihood that the target phrase was uttered by the target speaker.

7. The method of claim 6 wherein generating the speaker-verification score comprises performing a Viterbi search using a Hidden Markov Model (HMM) that lexically models the target phrase.

8. The method of claim 7 wherein, at each frame in the plurality of frames, the Viterbi search passes a feature vector corresponding to the frame as input to the ANN and generates a per-frame speaker-verification score based on one or more probabilities output by the ANN.

9. The method of claim 8 wherein the per-frame speaker-verification score for a state in the HMM corresponds to the probability output by the new output node in the ANN which is associated with that state in the HMM.

10. The method of claim 8 wherein the per-frame speaker-verification score for a state in the HMM corresponds to the probability output by a new output node in the ANN which is associated with that state in the HMM, less the probability output by the existing output node associated with the new output node in the ANN.

11. The method of claim 8 wherein generating the speaker-verification score further comprises applying a function to one or more of the per-frame speaker-verification scores to calculate the speaker-verification score.

12. The method of claim 11 wherein the function is an average function or a summation function.

13. The method of claim 11 wherein the function is applied to a subset of the per-frame speaker-verification scores that correspond to relevant frames in the plurality of frames, each relevant frame being classified, via the Viterbi search, as being part of a phoneme that is considered useful for speaker verification or identification.

14. A non-transitory computer readable storage medium having stored thereon program code executable by a computer system, the program code comprising:
    code that causes the computer system to store speech data for a plurality of speakers, the speech data including a plurality of feature vectors and, for each feature vector, an associated sub-phonetic class;
    code that causes the computer system to build, based on the speech data, an artificial neural network (ANN) for modeling speech of a target speaker in the plurality of speakers, the ANN being configured to discriminate between instances of sub-phonetic classes uttered by the target speaker and instances of sub-phonetic classes uttered by other speakers in the plurality of speakers;
    wherein the code that causes the computer system to build the ANN comprises:
    code that causes the computer system to retrieve an existing ANN that comprises a plurality of existing output nodes, each existing output node corresponding to a sub-phonetic class and being configured to output a probability that a feature vector input to the existing ANN is an instance of the sub-phonetic class uttered by one of the other speakers in the plurality of speakers; and
    code that causes the computer system to modify the existing ANN to generate the ANN, wherein the modifying causes the ANN to include an output layer that comprises the plurality of existing output nodes and, for each existing output node, a new output node that corresponds to the sub-phonetic class of the existing output node, the new output node being configured to output a probability that a feature vector input to the ANN is an instance of the sub-phonetic class uttered by the target speaker; and
    code that causes the computer to verify or identify the target speaker using the ANN.

15. The non-transitory computer readable storage medium of claim 14 wherein the code that causes the computer system to build the ANN further comprises:
    code that causes the computer system to train the ANN using a first portion of the speech data originating from the target speaker such that, for each feature vector and associated sub-phonetic class in the first portion, the new output node that corresponds to the associated sub-phonetic class is tuned to output a relatively higher probability and the existing output node that corresponds to the associated sub-phonetic class is tuned to output a relatively lower probability; and
    code that causes the computer system to train the ANN using a second portion of the speech data originating from the other speakers such that, for each feature vector and associated sub-phonetic class in the second portion, the new output node corresponding to the associated sub-phonetic class is tuned to output a relatively lower probability and the existing output node corresponding to the associated sub-phonetic class is tuned to output a relatively higher probability.

16. The non-transitory computer readable storage medium of claim 15 wherein the ANN further includes an input layer comprising a plurality of input nodes and one or more hidden layers comprising one or more hidden nodes.

17. The non-transitory computer readable storage medium of claim 16 wherein the input layer is connected to a lowest hidden layer in the one or more hidden layers via a first set of connections having a first set of weights, wherein the one or more hidden layers are connected from a lower layer to a higher layer via a second set of connections having a second set of weights, wherein a highest hidden layer in the one or more hidden layers is connected to the output layer via a third set of connections having a third set of weights, and wherein training the ANN using the first and second portions of the speech data comprises applying a back-propagation algorithm to modify the third set of weights without modifying the first or second set of weights.

18. The non-transitory computer readable storage medium of claim 14 wherein the code that causes the computer system to verify or identify the target speaker using the ANN comprises:
code that causes the computer system to receive an acoustic signal corresponding to an utterance of a target phrase;
code that causes the computer system to extract feature vectors from a plurality of frames in the acoustic signal; and
code that causes the computer system to generate, based on the feature vectors and the ANN, a speaker-verification score indicating a likelihood that the target phrase was uttered by the target speaker.

19. The non-transitory computer readable storage medium of claim 18 wherein generating the speaker-verification score comprises performing a Viterbi search using a Hidden Markov Model (HMM) that lexically models the target phrase.

20. The non-transitory computer readable storage medium of claim 19 wherein, at each frame in the plurality of frames, the Viterbi search passes a feature vector corresponding to the frame as input to the ANN and generates a per-frame speaker-verification score based on one or more probabilities output by the ANN.

21. The non-transitory computer readable storage medium of claim 20 wherein the per-frame speaker-verification score for a state in the HMM corresponds to the probability output by the new output node in the ANN which is associated with that state in the HMM.

22. The non-transitory computer readable storage medium of claim 20 wherein the per-frame speaker-verification score for a state in the HMM corresponds to the probability output by a new output node in the ANN which is associated with that state in the HMM, less the probability output by the existing output node associated with the new output node in the ANN.

23. The non-transitory computer readable storage medium of claim 20 wherein generating the speaker-verification score further comprises applying a function to one or more of the per-frame speaker-verification scores to calculate the speaker-verification score.

24. The non-transitory computer readable storage medium of claim 23 wherein the function is an average function or a summation function.

25. The non-transitory computer readable storage medium of claim 23 wherein the function is applied to a subset of the per-frame speaker-verification scores that correspond to relevant frames in the plurality of frames, each relevant frame being classified, via the Viterbi search, as being part of a phoneme that is considered useful for speaker verification or identification.

26. A system comprising:
a processor configured to:
store speech data for a plurality of speakers, the speech data including a plurality of feature vectors and, for each feature vector, an associated sub-phonetic class;
build, based on the speech data, an artificial neural network (ANN) for modeling speech of a target speaker in the plurality of speakers, the ANN being configured to discriminate between instances of sub-phonetic classes uttered by the target speaker and instances of sub-phonetic classes uttered by other speakers in the plurality of speakers;
wherein building the ANN comprises:
retrieving an existing ANN that comprises a plurality of existing output nodes, each existing output node corresponding to a sub-phonetic class and being configured to output a probability that a feature vector input to the existing ANN is an instance of the sub-phonetic class uttered by one of the other speakers in the plurality of speakers; and
modifying the existing ANN to generate the ANN, wherein the modifying causes the ANN to include an output layer that comprises the plurality of existing output nodes and, for each existing output node, a new output node that corresponds to the sub-phonetic class of the existing output node, the new output node being configured to output a probability that a feature vector input to the ANN is an instance of the sub-phonetic class uttered by the target speaker; and
verify or identify the target speaker using the ANN. (ANN).

27. The system of claim 26 wherein building the ANN further comprises:
training the ANN using a first portion of the speech data originating from the target speaker such that, for each feature vector and associated sub-phonetic class in the first portion, the new output node that corresponds to the associated sub-phonetic class is tuned to output a relatively higher probability and the existing output node that corresponds to the associated sub-phonetic class is tuned to output a relatively lower probability; and
training the ANN using a second portion of the speech data originating from the other speakers such that, for each feature vector and associated sub-phonetic class in the second portion, the new output node corresponding to the associated sub-phonetic class is tuned to output a relatively lower probability and the existing output node corresponding to the associated sub-phonetic class is tuned to output a relatively higher probability.

28. The system of claim 27 wherein the ANN further includes an input layer comprising a plurality of input nodes and one or more hidden layers comprising one or more hidden nodes.

29. The system of claim 28 wherein the input layer is connected to a lowest hidden layer in the one or more hidden layers via a first set of connections having a first set of weights, wherein the one or more hidden layers are connected from a lower layer to a higher layer via a second set of connections having a second set of weights, wherein a highest hidden layer in the one or more hidden layers is connected to the output layer via a third set of connections having a third set of weights, and wherein training the ANN using the first and second portions of the speech data comprises applying a back-propagation algorithm to modify the third set of weights without modifying the first or second set of weights.

30. The system of claim 26 wherein verifying or identifying the target speaker using the ANN comprises:
receiving an acoustic signal corresponding to an utterance of a target phrase;
extracting feature vectors from a plurality of frames in the acoustic signal; and
generating, based on the feature vectors and the ANN, a speaker-verification score indicating a likelihood that the target phrase was uttered by the target speaker.

31. The system of claim 30 wherein generating the speaker-verification score comprises performing a Viterbi search using a Hidden Markov Model (HMM) that lexically models the target phrase.

32. The system of claim 31 wherein, at each frame in the plurality of frames, the Viterbi search passes a feature vector corresponding to the frame as input to the ANN and generates a per-frame speaker-verification score based on one or more probabilities output by the ANN.

33. The system of claim 32 wherein the per-frame speaker-verification score for a state in the HMM corresponds to the probability output by the new output node in the ANN which is associated with that state in the HMM.

34. The system of claim 32 wherein the per-frame speaker-verification score for a state in the HMM corresponds to the probability output by a new output node in the ANN which is associated with that state in the HMM, less the probability output by the existing output node associated with the new output node in the ANN.

35. The system of claim 32 wherein generating the speaker-verification score further comprises applying a function to one or more of the per-frame speaker-verification scores to calculate the speaker-verification score.

36. The system of claim 35 wherein the function is an average function or a summation function.

37. The system of claim 35 wherein the function is applied to a subset of the per-frame speaker-verification scores that correspond to relevant frames in the plurality of frames, each relevant frame being classified, via the Viterbi search, as being part of a phoneme that is considered useful for speaker verification or identification.

* * * * *